United States Patent
Kosaka (10) Patent No.: US 7,001,974 B2
(45) Date of Patent: Feb. 21, 2006

(54) PROCESS FOR PRODUCING PLASTIC LENS AND PLASTIC LENS

(75) Inventor: Masahisa Kosaka, Tokyo (JP)

(73) Assignee: HOYA Corporation, Tokyo (JP)

( * ) Notice: Subject to any disclaimer, the term of this patent is extended or adjusted under 35 U.S.C. 154(b) by 288 days.

(21) Appl. No.: 10/448,046

(22) Filed: May 30, 2003

(65) Prior Publication Data

US 2003/0225202 A1    Dec. 4, 2003

(30) Foreign Application Priority Data

Jun. 4, 2002 (JP) .............................. 2002-162827

(51) Int. Cl.
*C08G 18/52* (2006.01)
(52) U.S. Cl. .................. 528/73; 524/420; 524/742; 525/535; 351/159
(58) Field of Classification Search .................. None
See application file for complete search history.

(56) References Cited

U.S. PATENT DOCUMENTS

| 5,807,975 | A | 9/1998 | Amagai et al. |
| 5,945,504 | A | 8/1999 | Amagi et al. |
| 6,444,146 | B1 * | 9/2002 | Yoshimura et al. ........ 264/1.32 |
| 2003/0194487 | A1 | 10/2003 | Kosaka |
| 2004/0122201 | A1 | 6/2004 | Yoshimura et al. |
| 2005/0062932 | A1 * | 3/2005 | Kosaka et al. .............. 351/159 |

FOREIGN PATENT DOCUMENTS

| EP | 1046931 | 4/2000 |
| EP | 1046931 A2 | 10/2000 |
| EP | 1134242 | 9/2001 |
| EP | 1326095 A1 | 7/2003 |
| EP | 1348726 A1 | 10/2003 |
| JP | 03-081320 | 4/1991 |
| JP | 09-071580 | 3/1997 |
| JP | 09-110979 | 4/1997 |
| JP | 09-255781 | 9/1997 |
| JP | 11-140070 | 5/1999 |
| JP | 11-180977 | 6/1999 |
| JP | 11-183702 | 7/1999 |
| JP | 11-189592 | 7/1999 |
| JP | 2001-002783 | 1/2001 |
| JP | 2001-002933 | 1/2001 |
| JP | 2001-330701 | 11/2001 |
| JP | 2002122701 A | 4/2004 |
| WO | WO 89/10575 | 11/1989 |

OTHER PUBLICATIONS

European Search Report dated Nov. 16, 2004.

* cited by examiner

*Primary Examiner*—Rachel Gorr
(74) *Attorney, Agent, or Firm*—Finnegan, Henderson, Farabow, Garrett & Dunner, LLP (57) ABSTRACT

The present invention provides a process for producing plastic lenses, which are transparent, less colored, are not remarkably deteriorated in basic physical properties such as mechanical strength and impact resistance, and have higher refractive index and Abbe's number, and plastic lenses.

19 Claims, 3 Drawing Sheets

PROCESS FOR PRODUCING PLASTIC LENS AND PLASTIC LENS

CROSS-REFERENCE TO THE RELATED APPLICATION

The present application claims priority under 35 U.S.C. § 119 of Japanese Application No. 2002-162827, filed Jun. 4, 2002, the disclosure of which is expressly incorporated by reference herein. The subject matter of this application is related to, but does not claim the benefit of, application Ser. No. 10/390,688.

DESCRIPTION OF THE INVENTION

1. Field of the Invention

The present invention relates to a process for producing plastic lenses for spectacles having a high refractive index and a high Abbe's number and having excellent transparency and to plastic lenses obtained by the process.

2. Background of the Invention

In the market of plastic lenses, plastic lenses having higher refractive index and Abbe's number without remarkably deteriorating basic physical properties such as mechanical strength and impact resistance are demanded.

As an example of such plastic lenses, JP-A-2001-330701 discloses a plastic lens having a refractive index of about 1.70 and constituted of an epithio group-containing compound, a polythiol compound, and a polyisocyanate compound.

However, plastic lenses having a higher refractive index than that of the plastic lens as disclosed in JP-A-2001-330701 are demanded in the market.

Optical materials having a large refractive index and a large Abbe's number are disclosed in EP-A-1 046 931. These optical materials are obtained from a composition which comprises a mixture of a compound comprising sulfur and an inorganic compound comprising at least one atom of sulfur atom and selenium atom. However, plastic lenses comprising sulfur often exhibit insufficient transparency and tend to be colored, in particular yellowish.

SUMMARY OF THE INVENTION

The invention relates to a process for producing a plastic lens, which comprises mixing a) a prepolymer with b) a mixture comprising sulfur having a purity of 98% or more, from which impurities having a boiling point of 120° C. or lower have substantially been removed, in an epithio group-containing compound and c) a catalyst.

An embodiment 1 of the invention is a process for producing a plastic lens, which comprises a step of preparing three kinds of starting materials of the lens, (1) a prepolymer obtained by reacting a polyisocyanate compound and a polythiol compound in an epithio group-containing compound, (2) a mixed solution obtained by mixing an epithio group-containing compound and sulfur having a purity of 98% or more, from which impurities having a boiling point of 120° C. or lower have substantially been removed, and (3) a catalyst. Alternatively, the third starting material may be obtained by mixing an epithio group-containing compound and/or a polythiol compound with a catalyst to provide a mixed solution.

Further embodiments include:

Embodiment 2: The process for producing a plastic lens according to embodiment 1, wherein a ratio of the polythiol compound to the polyisocyanate compound in the prepolymer is 1.75 or more in terms of an —SH/—NCO molar ratio.

Embodiment 3: The process for producing a plastic lens according to embodiment 1, wherein a weight of the epithio group-containing compound in the prepolymer is 50% by weight or more on a basis of the whole amount of the starting materials of the prepolymer.

Embodiment 4: The process for producing a plastic lens according to any one of embodiments 1 to 3, wherein the content of sulfur is in the range of from 5 to 30% by weight on a basis of the whole amount of the starting materials (1) to (3) of the lens.

Embodiment 5: The process for producing a plastic lens according to any one of embodiments 1 to 4, wherein the content of the whole of the polyisocyanate and the polythiol compounds used for the starting materials (1) and (3) of the lens is 15% by weight or less on a basis of the whole amount of the starting materials (1) to (3) of the lens.

Embodiment 6: The process for producing a plastic lens according to embodiment 1, wherein the viscosity of the prepolymer is 5,000 mPa·s (25° C.) or less.

Embodiment 7: The process for producing a plastic lens according to embodiment 1, wherein the polyisocyanate compound is one or more members selected from bis(isocyanatomethyl)bicyclo[2,2,1]heptane, cyclohexane diisocyanate, and bis(isocyanatomethyl)-1,4-dithiane.

Embodiment 8: The process for producing a plastic lens according to embodiment 1, wherein the polythiol compound is at least one member selected from bis(mercaptomethyl)-1,4-dithiane, bis(mercaptoethyl) sulfide, bis(mercaptoethyl) disulfide, and 1,2-bis(mercaptoethyl)thio-3-mercaptopropane.

Embodiment 9: The process for producing a plastic lens according to embodiment 1, wherein the epithio group-containing compound is bis(β-epithiopropyl) sulfide and/or bis(β-epithiopropyl) disulfide.

Embodiment 10: The process for producing a plastic lens according to any one of embodiments 1 to 9, wherein a catalyst is added to a liquid for preparing the prepolymer.

Embodiment 11: The process for producing a plastic lens according to embodiment 10, wherein the catalyst is represented by the following general formula (I):

wherein $R_1$ to $R_4$, which may be the same or different, each represents an alkyl group having from 1 to 4 carbon atoms.

Embodiment 12: The process for producing a plastic lens according to embodiment 11, wherein the catalyst represented by the general formula (I) is at least one member selected from tetramethyl-diacetoxy-distannoxane, tetraethyl-diacetoxy-distannoxane, tetrapropyl-diacetoxy-distannoxane, and tetrabutyl-diacetoxy-distannoxane.

Embodiment 13: The process for producing a plastic lens according to any one of embodiments 1 to 12, further comprising a step of forming a cured film on the plastic lens.

Embodiment 14: The process for producing a plastic lens according to embodiment 13, wherein the cured film is prepared from an organosilicon compound as a starting material.

Embodiment 15: The process for producing a plastic lens according to embodiment 13 or 14, further comprising a step of forming an antireflection film made of an inorganic substance on the cured film.

Embodiment 16: The process for producing a plastic lens according to embodiment 15, further comprising a step of forming a water repellent film made of a fluorine atom-containing organosilicon compound on the antireflection film.

Embodiment 17: A plastic lens obtained by the process according to any one of embodiments 1 to 16.

DETAILED DESCRIPTION OF THE INVENTION

The particulars shown herein are by way of example and for purposes of illustrative discussion of the various embodiments of the present invention only. In this regard, no attempt is made to show details of the invention in more detail than is necessary for a fundamental understanding of the invention, the description making apparent to those skilled in the art how the several forms of the invention may be embodied in practice.

The result of the invention is a color-suppressed plastic lens that may be prepared from an epithio group-containing compound, a polythiol compound, a polyisocyanate compound, and sulfur having a purity of 98% of more, from which impurities having a boiling point of 120° C. or lower have been removed.

Hitherto, there have been proposals to prepare plastic lenses by adding sulfur to lens monomers in JP-A-2001-2783 and JP-A-2001-2933. However, even when the technique of JP-A-2001-330701 as cited above is combined with those of JP-A-2001-2783 and JP-A-2001-2933, it was impossible to obtain a transparent plastic lens containing an epithio group-containing compound, a polythiol compound, a polyisocyanate compound, and sulfur. As disclosed in the invention, it is possible to obtain a transparent plastic lens containing an epithio group-containing compound, a polythiol compound, a polyisocyanate compound, and sulfur by previously preparing the three kinds of starting materials of the lens, mixing these three kinds of starting materials of the lens, and polymerizing the mixture.

The prepolymer that is one of the three kinds of starting materials of the lens may be a polythiourethane prepolymer which is obtainable by reacting a polyisocyanate compound and a polythiol compound, preferably in an epithio group-containing compound.

Non-limiting examples of suitable polyisocyanate compounds include xylylene diisocyanate, 3,3'-dichlorodiphenyl-4,4'-diisocyanate, 4,4'-diphenylmethane diisocyanate, hexamethylene diisocyanate, 2,5-bis(isocyanatomethyl)-1,4-dithiane, bis(isocyanatomethyl) sulfide, bis(isocyanatoethyl) sulfide, bis(isocyanatomethyl) disulfide, bis(isocyanatoethyl) disulfide, 2,2',5,5'-tetrachlorodiphenyl-4,4'-diisocyanate, and tolylene diisocyanate. Polyisocyanates having one or more alicyclic groups can also be used. Specific examples include bis(isocyanatomethyl)cyclohexane, bis(4-isocyanatocyclohexyl)methane, bis(4-isocyanatomethylcyclohexyl)methane, cyclohexane diisocyanate, isophorone diisocyanate, 2,5-bis(isocyanatomethyl)bicyclo[2,2,2]octane, 2,5-bis(isocyanatomethyl)bicyclo[2,2,1]heptane, 2-isocyanatomethyl-3-(3-isocyanatopropyl)-5-isocyanatomethyl-bicyclo[2,2,1]-heptane, 2-isocyanatomethyl-3-(3-isocyanatopropyl)-6-isocyanatomethyl-bicyclo[2,2,1]-heptane, 2-isocyanatomethyl-2-[3-isocyanatopropyl]-5-isocyanatomethyl-bicyclo[2,2,1]-heptane, 2-isocyanatomethyl-2-(3-isocyanatopropyl)-6-isocyanatomethyl-bicyclo[2,2,1]-heptane, 2-isocyanatomethyl-3-(3-isocyanatopropyl)-6-(2-isocyanatoethyl)-bicyclo[2,2,1]-heptane, 2-isocyanatomethyl-3-(3-isocyanatopropyl)-6-(2-isocyanatoethyl)-bicyclo[2,2,1]-heptane, 2-isocyanatomethyl-2-(3-isocyanatopropyl)-5-(2-isocyanatoethyl)-bicyclo[2,2,1]-heptane, and 2-isocyanatomethyl-2-(3-isocyanatopropyl)-6-(2-isocyanatoethyl)-bicyclo[2,2,1]-heptane.

Of these, bis(isocyanatomethyl)bicyclo[2,2,1]heptane, cyclohexane diisocyanate, and bis(isocyanatomethyl)-1,4-dithiane are enumerated as the preferred polyisocyanates.

Non-limiting examples of suitable polythiol compounds include compounds having sulfur other than a mercapto group, such as methanedithiol, ethanedithiol, propanedithiol, 1,6-hexanedithiol, 1,2,3-propanetrithiol, tetrakis(mercaptomethyl)methane, cyclohexanedithiol, 2,2-dimethylpropane-1,3-dithiol, 3,4-dimethoxybutane-1,2-dithiol, 2-methylcyclohexane-2,3-dithiol, bis(mercaptomethyl)cyclohexane, 2,3-dimercapto-1-propanol(2-mercaptoacetate), 2,3-dimercapto-1-propanol(3-mercaptoacetate), diethylene glycol bis(2-mercaptoacetate), diethylene glycol bis(3-mercaptopropionate), 1,2-dimercaptopropyl methyl ether, 2,3-dimercaptopropyl methyl ether, 2,2-bis(mercaptomethyl)-1,3-propanedithiol, bis(2-mercaptoethyl) ether, ethylene glycol bis(2-mercaptoacetate), ethylene glycol bis(3-mercaptopropionate), trimethyloylpropane tris(2-mercaptoacetate), trimethylolpropane tris(3-mercaptopropionate), pentaerythritol tetrakis(2-mercaptoacetate), pentaerythritol tetrakis(3-mercaptopropionate), 1,2-bis(2-mercaptoethylthio)-3-mercaptopropane, bis(mercaptomethyl) sulfide, bis(mercaptoethyl) sulfide, bis(mercaptopropyl) sulfide, bis(mercaptomethylthio)methane, bis(2-mercaptoethylthio)methane, bis(3-mercaptopropyl)methane, 1,2-bis(mercaptomethylthio)ethane, 1,2-(2-mercaptoethylthio)ethane, 1,2-(3-mercaptopropyl)ethane, 1,3-bis(mercaptomethylthio)propane, 1,3-bis(2-mercaptoethylthio)propane, 1,3-bis(3-mercaptopropylthio)propane, 1,2-bis(2-mercaptoethylthio)-3-mercaptopropane, 2-mercaptoethylthio-1,3-propanedithiol, 1,2,3-tris(mercaptomethylthio)propane, 1,2,3-tris(2-mercaptoethylthio)propane, 1,2,3-tris(3-mercaptopropylthio)propane, tetrakis(mercaptomethylthiomethyl)methane, tetrakis(2-mercaptoethylthiomethyl)methane, tetrakis(3-mercaptopropylthiomethyl)methane, bis(mercaptomethyl) disulfide, bis(mercaptoethyl) disulfide, bis(mercaptomethyl)-3,6,9-trithia-1,11-undecanedithiol, bis(1,3-dimercapto-2-propyl) sulfide, 3,4-thiophenedithiol, tetrahydrothiophene-2,5-dimercaptomethyl, 2,5-dimercapto-1,3,4-thiadiazole, 2,5-dimercapto-1,4-dithiane, 2,5-bis(mercaptomethyl)-1,4-dithiane, and 2,5-bis(mercaptoethyl)-1,4-dithiane.

Of these, bis(mercaptomethyl)-1,4-dithiane, bis(mercaptoethyl) sulfide, bis(mercaptoethyl) disulfide, and 1,2-bis(mercaptoethyl)thio-3-mercaptopropane are preferred as the polythiol compound that is used in the invention.

The epithio group-containing compound is also called an episulfide-based monomer. Non-limiting examples of suitable monomers include episulfide compounds having an alicyclic skeleton, such as 1,3- and 1,4-bis(β-epithiopropylthio)cyclohexanes, 1,3- and 1,4-bis(β-epithiopropylthiomethyl)cyclohexanes, bis[4-(β-epithiopropylthio)cyclohexyl]methane, 2,2-bis[4-(β-epithiopropylthio)cyclohexyl]propane, and bis[4-(β-epithiopropylthio)cyclohexyl] sulfide;

episulfide compounds having an aromatic skeleton, such as 1,3- and 1,4-bis(β-epithiopropylthio)benzenes, 1,3- and 1,4-bis(β-epithiopropylthiomethyl)benzenes, bis[4-(β-epithiopropylthio)phenyl]methane, 2,2-bis[4-(β-epithiopropylthio)phenyl]propane, bis[4-(β-epithiopropylthio)phenyl] sulfide, bis[4-(β-epithiopropylthio)phenyl]sulfine, and 4,4-bis(β-epithiopropylthio)biphenyl; episulfide compounds having a dithiane ring skeleton, such as 2,5-bis(β-epithiopropylthiomethyl)-1,4-dithiane, 2,5-bis(β-epithiopropylthioethylthiomethyl)-1,4-dithiane, 2,5-bis(β-epithiopropylthioethyl)-1,4-dithiane, and 2,3,5-tri(β-epithiopropylthioethyl)-1,4-dithiane; and episulfide compounds having an aliphatic skeleton, such as 2-(2-β-epithiopropylthioethylthio)-1,3-bis(β-epithiopropylthio)propane, 1,2-bis[(2-β-epithiopropylthioethyl)thio]-3-(β-epithiopropylthio)propane, tetrakis(β-epithiopropylthiomethyl)methane, 1,1,1-tris(β-epithiopropylthiomethyl)propane and bis(β-epithiopropyl) sulfide.

Further, many suitable epithio group-containing compounds are conventionally known, and specific examples thereof are disclosed in, for example, JP-A-09-071580, JP-A-09-110979, JP-A-09-255781, JP-A-03-081320, JP-A-11-140070, JP-A-11-183702, JP-A-11-189592, JP-A-11-180977, Japanese Domestic Re-Publication No. 01-810575, and U.S. Pat. Nos. 5,807,975 and 5,945,504. The episulfide-based monomers disclosed in these patents are also employable in the present invention.

Of these compounds, bis(β-epithiopropyl) sulfide is preferred as the epithio group-containing compound to be used in the present invention.

In addition, in order to promote the reaction between the polyisocyanate compound and the polythiol compound, a catalyst may be added to the liquid of the starting materials for preparing the prepolymer.

One catalyst that may be used is a tin compound represented by the following general formula (I):

(I)

wherein $R_1$ to $R_4$, which may be the same or different, each represents an alkyl group having from 1 to 4 carbon atoms.

Specific examples of the catalyst represented by the general formula (I) include tetramethyl-diacetoxy-distannoxane, tetraethyl-diacetoxy-distannoxane, tetrapropyl-diacetoxy-distannoxane, and tetrabutyl-diacetoxy-distannoxane. An amount of the catalyst to be added may be in the range of from 0.0005% by weight to 0.1% by weight on a basis of the whole amount of the starting materials of the prepolymer.

In the prepolymer, with respect to a mixing ratio of the polyisocyanate compound and the polythiol compound, the polythiol compound may be formulated in an excessive state so as to thiolate the end terminals of the prepolymer as far as possible. The mixing ratio may be 1.75 or more in terms of an —SH/—NCO molar ratio.

Further, the epithio group-containing compound may be used for playing a role as a reactive diluent during the preparation of the prepolymer. Taking into account the viscosity at which the prepolymer can be treated during dissolution of the sulfur, the amount of the epithio group-containing compound to be added during the preparation of the prepolymer may be 50% by weight or more on the basis of the whole amount of the starting materials of the prepolymer. In the case where the viscosity of the prepolymer is large, an epithio group-containing compound may be properly added in order to regulate the viscosity of the prepolymer. When the epithio group-containing compound is used as the starting material of the prepolymer, it is considered that even when a polythiourethane is formed by the reaction of the polyisocyanate compound and the polythiol compound, the epithio group-containing compound dissolves the formed polythiourethane therein so that it becomes possible to control an increase of the viscosity.

Taking into consideration works of mixing with other starting materials of the lens and pouring works, the viscosity of the prepolymer is preferably 5,000 mPa·s or less at 25° C.

The temperature and reaction time for the preparation of the prepolymer are not particularly limited. The reaction may be carried out at from 10 to 80° C. for from 1 to 48 hours. Further, in order to keep the storage stability of the prepolymer after the preparation, the prepolymer can be cooled to from about −5° C. to room temperature.

From the standpoints of obtaining good heat resistance and keeping a stable lens shape, it is desirable that a content of the whole of the polyisocyanate compound and the polythiol compounds is 15% by weight or less on a basis of the whole amount of the starting materials of the lens.

Next, the second starting material of the three kinds of starting materials of the lens, which is obtained by mixing an epithio group-containing compound and sulfur having a purity of 98% or more, from which impurities having a boiling point of 120° C. or lower have substantially been removed, will be described.

An object of mixing sulfur and the epithio group-containing compound is to efficiently dissolve sulfur. In the case where sulfur is added to the polythiol compound and the polyisocyanate compound as other starting materials, gases are likely generated during the dissolution, or sulfur is not dissolved so that the obtained lens is inferior in transparency, and hence, such is not preferred. From the standpoints of obtaining an improving effect of refractive index and surely obtaining transparent lenses it is desirable that an amount of sulfur to be added is in the range of from 5 to 30% by weight on a basis of the whole amount of the starting materials of the lens.

The sulfur that is used in the present invention is one having a purity of 98% or more, from which impurities having a boiling point of 120° C. or lower have substantially been removed. The boiling point is determined at atmospheric pressure.

As used herein the term "substantially removed" means that the impurities having a boiling point of 120° C. or lower have been removed to an extent that the obtained lens is less colored than a lens containing the impurities having a boiling point of 120° C. or lower, when using the same lens monomer. Preferably the lens is not colored when assessed visually by the naked eye. Advantageously the impurities having a boiling point of 120° C. or lower have been removed to an extent that the yellowness index of the obtained lens (when measured as defined in JIS K7103-1977) is <15, or <10, or <5 or <2.

In one embodiment, the sulfur used in the present invention has a content of impurities having a boiling point of 120° C. or lower of less than 0.0001% by weight, or of less than 0.00001% by weight or of 0.000001% by weight or less on the basis of the total weight of the sulfur.

The sulfur to be used in the invention will be described below in detail.

Sulfur or flowers of sulfur having a purity of 99% or more are commercially available from, for example, Wako Pure Chemical Industries, Ltd. If such sulfur is used as it stands, even when commercially available sulfur having a purity of 99.9999% is used, the resulting lenses may possibly be colored yellow. For this reason, in order to market such lenses as lenses for spectacles, it is expected that it is required to make the lenses less colored. It has been found that less colored lenses can be obtained by using sulfur obtained by heating commercially available sulfur (including flowers of sulfur) having e.g. a purity of 99% or more, and substantially removing impurities having a boiling point of 120° C. or lower as contained therein.

The method of removal of impurities having a boiling point of 120° C. or lower is not particularly limited. Examples include a method in which the impurities are removed upon heating at atmospheric pressure or under reduced pressure, a method in which the sulfur is sublimated and recrystallized, and a method in which the sulfur is dissolved upon heating and recrystallized.

Among these methods, a method in which the sulfur is sublimated upon heating and recrystallized to substantially remove the impurities will be described below.

Figure 1:
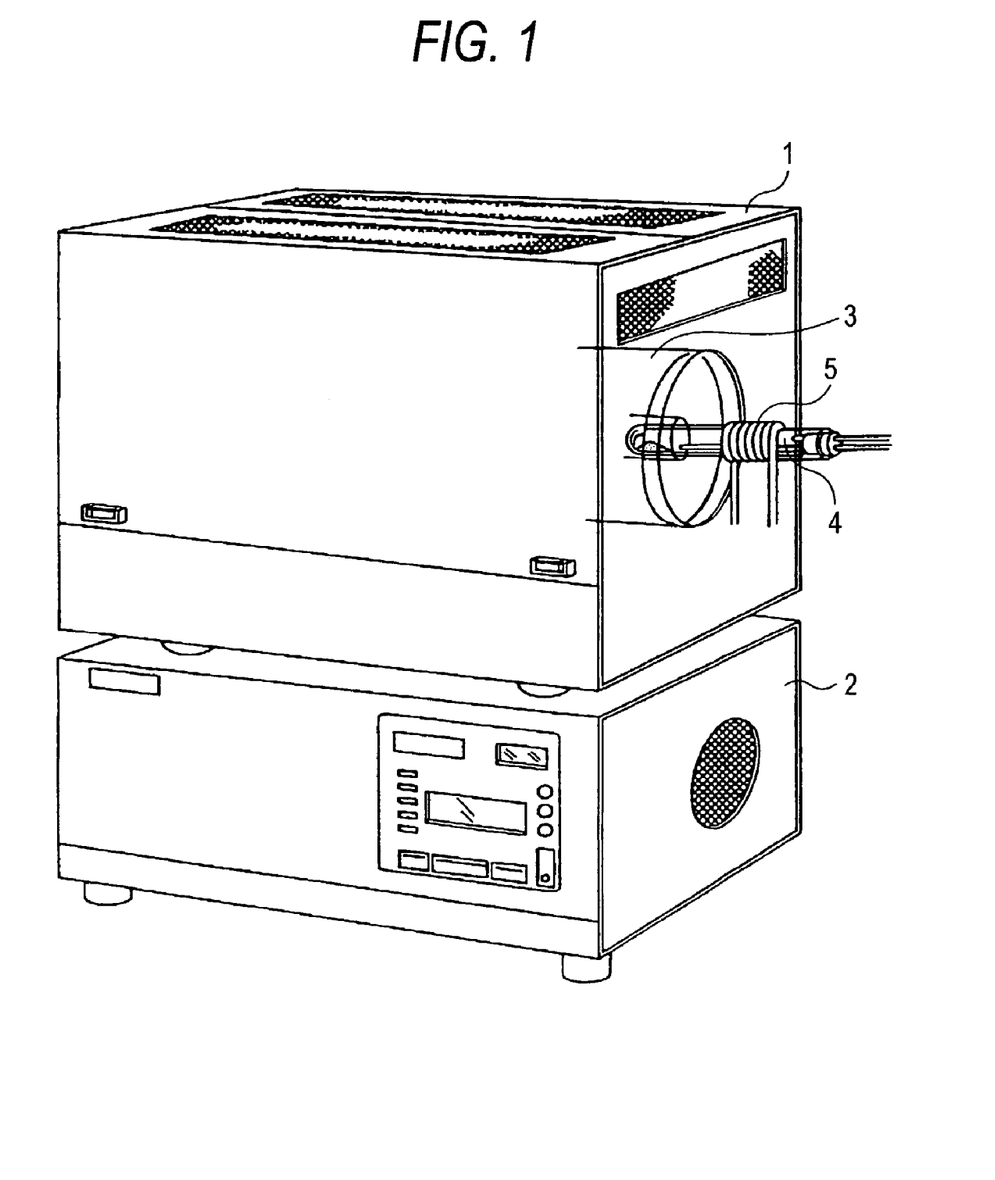
FIG. 1 A schematic view showing a method in which sulfur is sublimated upon heating and recrystallized to remove impurities.
Figure 2:
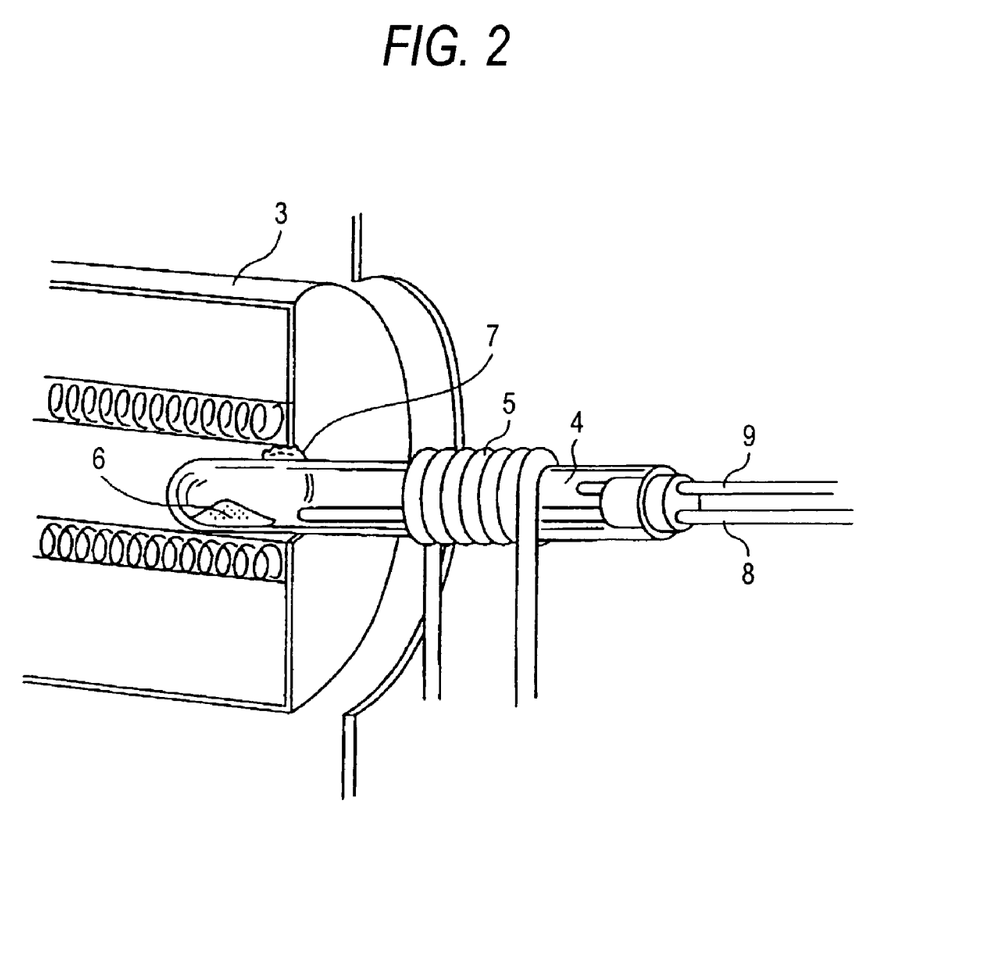
FIG. 2 A detailed view showing a method in which sulfur is sublimated upon heating and recrystallized to remove impurities.

The present invention can be practiced using a device as shown in FIGS. 1 and 2. In FIG. 2, nitrogen gas is blown into the tube to undergo evacuation. This is made for the purposes of making impurities or sulfur not react with oxygen, etc. and evacuating the impurities. Further, a cooling hose (such as a vinyl hose) is wound around the tube, and the tube is water-cooled. This is made for the purpose of depositing the sublimated sulfur. Since the sublimation temperature of sulfur is 444.6° C., it is preferred to gradually elevate the temperature from about 300° C. In the device as shown in FIG. 1, the sublimation is achieved by controlling the temperature of a horizontal tubular electric furnace while gradually elevating the temperature to 460° C.

Figure 3:
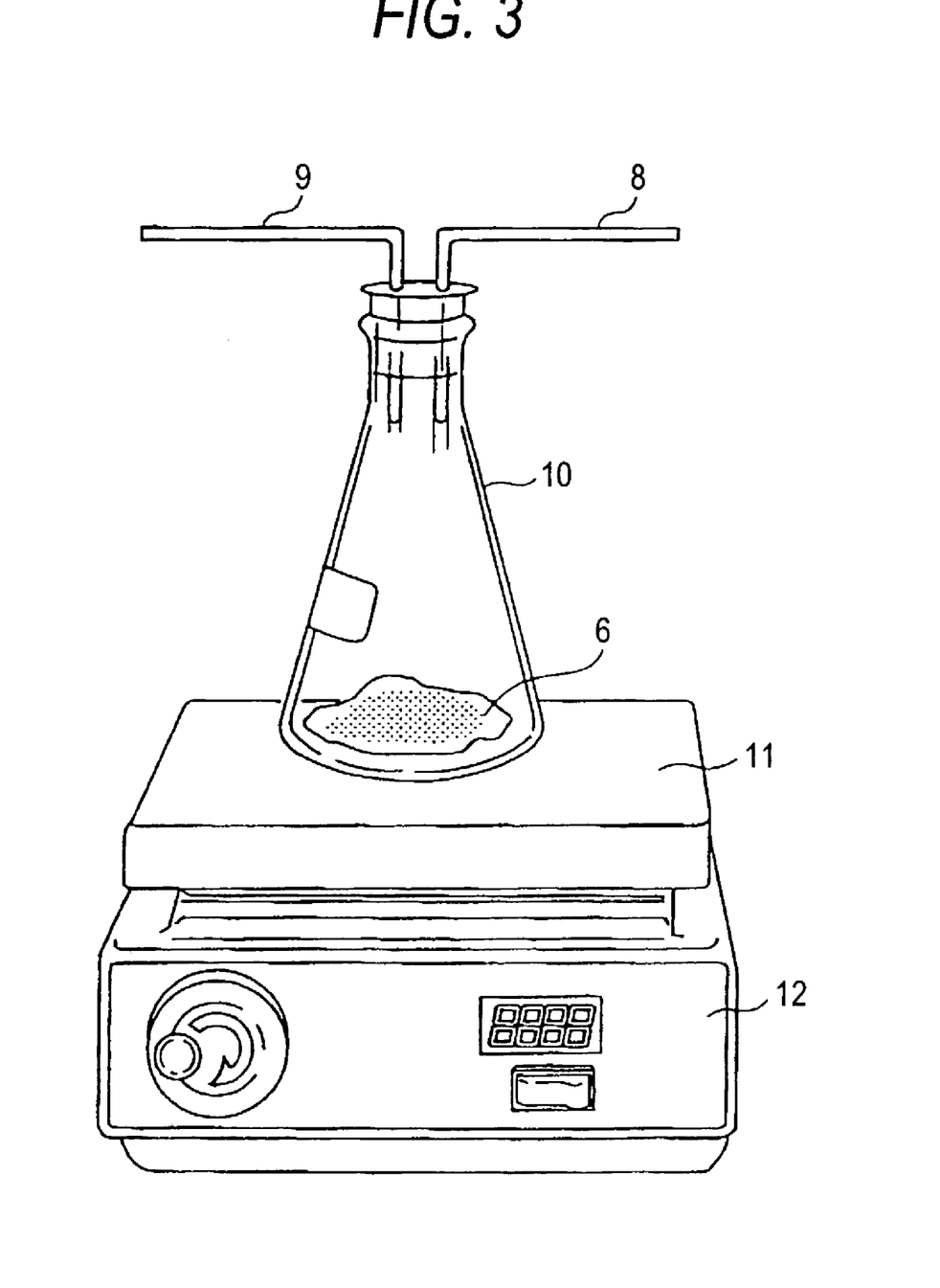
FIG. 3 A schematic view showing a method in which sulfur is dissolved upon heating and recrystallized to remove impurities.

Next, the method in which the sulfur is dissolved upon heating and then recrystallized to remove the impurities will be described below. As shown in FIG. 3, a device is configured such that a magnetic stirrer equipped with a heatable hot plate is used, sulfur is charged in a vessel such as an Erlenmeyer flask, and nitrogen gas is blown in the vessel, thereby enabling to undergo evacuation. The sulfur is dissolved upon heating and then cooled for recrystallization. With respect to the heating temperature in the heat and dissolution method, there are no particular limitations so far as the impurities can be removed upon heating at that temperature. In the case where it is intended to shorten the heating time, it is preferred to employ a high temperature largely exceeding the boiling points of the impurities but not exceeding the sublimation temperature of the sulfur.

Incidentally, the sulfur that is used in the invention has a purity of 98% or more. From the viewpoint of obtaining lenses that are transparent, less colored and have a high refractive index and a high Abbe's number, it is preferred that the sulfur before the removal of impurities has a purity of 98% or more.

As the epithio group-containing compound to be mixed with sulfur, compounds the same as or different from the epithio group-containing compounds to be used during the preparation of the prepolymer can be used.

In order to obtain the mixture by mixing sulfur with and dissolving it in the epithio group-containing compound, the mixed liquid may be heated and dissolved at from 40° C. to 70° C. and then stirred at from 30 to 50° C. for from 1 hour to 24 hours in order to prevent deposition of sulfur. Further, during mixing the three kinds of starting materials, the mixture can be cooled to from 10 to 25° C.

The mixture which is the third starting material of the lens is obtained by mixing an epithio group-containing compound and/or a polythiol compound and a catalyst, will now be described.

As the epithio group-containing compound, the epithio group-containing compounds that are used during the preparation of the prepolymer and the mixture with sulfur can be used. In this case, the epithio group-containing compounds may be the same or may be different from those used for the prepolymer and the mixture with sulfur.

Similarly, as the polythiol compound, the polythiol compounds used for the prepolymer can be used. In this case, the polythiol compounds may be the same or may be different from those used during the preparation of the prepolymer.

The catalyst that is used during the preparation of or as the third starting material is added with intent to react the epithio group-containing compound or the polythiol and the epithio group-containing compound. As the catalyst can be enumerated amines, phosphines, quaternary ammonium salts, quaternary phosphonium salts, tertiary sulfonium salts, secondary iodonium salts, miral acids, Lewis acids, organic acids, silicates, and tetrafluoroborates.

Examples of the catalyst include aminoethanol, 1-aminopropanol, 2-aminopropanol, aminobutanol, aminopentanol, aminohexanol, tetramethylphosphonium chloride, tetramethylphosphonium bromide, tetraethylphosphonium chloride, tetraethylphosphonium bromide, tetra-n-butylphosphonium chloride, tetra-n-butylphosphonium bromide, tetra-n-butylphosphonium iodide, tetra-n-hexylphosphonium bromide, and tetra-n-octylphosphonium bromide.

Further, with respect to the catalyst to be used as or in the third starting material, it is necessary that the catalyst to be used is selected and that its amount is regulated depending upon the monomers to be used. But, the amount is generally from 0.001% by weight to 0.1% by weight on the basis of the amount of the whole of the starting materials of the lens.

These three kinds of starting materials are prepared and mixed. The mixing method is not particularly limited. In mixing, the setting temperature, the time required for this, and the like may be basically those conditions under which the respective components are thoroughly mixed. Excessive temperature and time will likely cause a non-preferred reaction among the respective starting materials and additives and additionally an increase in the viscosity, thereby making the casting operation difficult, and hence, such is not proper.

From these viewpoints, the mixing temperature may be in the range of from −30° C. to 50° C., or in the range of from −5° C. to 30° C. The mixing time is from about 5 minutes to 2 hours, or from about 5 minutes to 15 minutes.

Further, to undergo a degassing operation in vacuo before, during or after mixing the respective starting materials and additives may be desirable from the standpoint of preventing the generation of bubbles during cast polymerization curing to be carried out later. At this time, the degree of vacuum may be in the range of from about 0.1 mmHg to 50 mmHg, or in the range of from 1 mmHg to 20 mmHg.

Moreover, to purify these mixtures or main and sub-starting materials before mixing by filtration of impurities by a filter having a pore diameter of from about 0.05 to 3 μm may be desirable from the standpoint of further enhancing the quality of the optical materials of the invention.

The mixed starting materials and the like are poured into a glass or metallic mold and subjected to polymerization curing in an electric furnace or the like. The curing temperature may be from 5° C. to 120° C. and the curing time is generally from about 1 to 72 hours. Further, to subject the material after completion of the curing to an annealing processing at a temperature of from 50 to 150° C. for from about 10 minutes to 5 hours may be desirable for eliminating strains of the optical materials of the invention.

In the case where after the polymerization, the plastic lens of the invention is hardly peeled apart from the mold, using or adding known external and/or internal releasing agents may enhance the release properties. Further, for the purpose of protecting the resin or eyes from ultraviolet rays, UV absorbers may be used; and for the purpose of protecting eyes from infrared rays, IR absorbers may be used. Their amounts vary depending upon the absorptive ability and maximum absorption wavelength of additives to be used, but are from about 0.03% by weight to 3% by weight. Also, there is employable a method for impregnating these absorbers in the resin later.

In addition, for the purpose of keeping or enhancing the appearance of the resin, an antioxidant may be added, or bluing with a small amount of a coloring matter may be employed.

The plastic lens obtained in the invention can be subjected to a dyeing process with a dye. Also, in order to enhance the resistance to marring, a cured film may be formed on the plastic lens using a coating liquid comprising an organosilicon compound or an acrylic compound having finely divided inorganic materials such as tin oxide, silicon oxide, zirconium oxide, and titanium oxide.

Further, in order to enhance the impact resistance, a primer layer composed mainly of polyurethane may be formed on the plastic lens.

Moreover, in order to impart an antireflection performance, an antireflection film made of an inorganic material such as silicon oxide, titanium dioxide, zirconium oxide, and tantalum oxide may be formed on the cured film. In addition, in order to enhance the water repellence, a water repellent film made of a fluorine atom-containing organo-silicon compound may be formed on the antireflection film.

The present invention further relates to a plastic lens comprising sulfur having a purity of 98% or more, from which impurities having a boiling point of 120° C. or lower have substantially been removed. Such lenses are obtainable by the above described process as well as by reacting a polyisocyanate compound, a polythiol compound, an epithio group-containing compound and sulfur having a purity of 98% or more, from which impurities having a boiling point of 120° C. or lower have substantially been removed.

Preferably the plastic lens of the present invention is transparent, i.e. preferably has the same or essentially the same transparency as a plastic lens of the same thickness and being prepared from the same starting materials in the same amounts but without sulfur.

The transparency of the lens is defined by its transmission factor $t=\Phi_{ex}/\Phi_{in}$, wherein $\Phi_{ex}$ is the radiation flux of a light beam emerging the lens and $\Phi_{in}$ is the radiation flux of the light beam shining into the lens, the light beam being visible (i.e. having a wavelength in the range of 400 to 750 nm).

The value of transparency of the lens depends on the value of refractive index of the lens, without coating of any anti-reflective film, because a lens having a high refractive index shows high reflection.

The transparent lens of the present invention when having a refractive index of 1.55 to 1.65 desirably has a transparency in the range of 0.80–0.92, or in the range of 0.85–0.92 or in the range of 0.88–0.92, when measured with a lens having a thickness of 1.8 mm at any wavelength in the range of 500 nm to 600 nm.

The transparent lens of the present invention when having a refractive index of 1.66 to 1.76 desirably has a transparency in the range of 0.80–0.91, or in the range of 0.85–0.91 or in the range of 0.88–0.91, when measured with a lens having a thickness of 1.8 mm at any wavelength in the range of 500 nm to 600 nm.

The drawings are briefly described below.

DESCRIPTION OF REFERENCE NUMERALS AND SIGNS

1: Electric furnace device
2: Electric furnace control device
3: Horizontal tubular electric furnace
4: Quartz test tube (74Φ×800 mm)
5: Cooling hose
6: Sulfur crystals
7: Kaowool
8: Nitrogen inhalation tube
9: Nitrogen discharge tube
10: Erlenmeyer flask
11: Hot plate
12: Magnetic stirrer The invention will be described below in more detail with reference to the Examples, but it should not be construed that the invention is limited to these Examples.

Incidentally, the physical properties of the plastic lenses for spectacles obtained in the Examples and Comparative Examples were evaluated in the following manners.

(1) Refractive index and Abbe's number:
Measured at 20° C. using a precision refractometer, Model KPR-200 manufactured by Kalnew Optical Industrial Co., Ltd.

(2) Transparency:
Visually measured.

(3) Measurement of YI value:
Measured according the yellowness index of plastics and yellowness index test method as defined in JIS K7103-1977.

The present invention will be further illustrated by way of the following Examples. These examples are non-limiting and do not restrict the scope of the invention.

EXAMPLE 1

(a) Preparation of Prepolymer (Component A)

In a three-necked flask were charged 14.40 parts by weight of bis(isocyanatomethyl)-1,4-dithiane, 33.20 parts by weight of bis(mercaptomethyl)-1,4-dithiane, 0.024 parts by weight of tetra-n-butyl-1,3-diacetoxy-distannoxane, and 47.60 parts by weight of bis (β-epithiopropyl) sulfide, and the mixture was reacted under stirring in a nitrogen atmosphere for 24 hours while keeping at 50° C. Thereafter, the reaction mixture was cooled to a temperature in the vicinity of room temperature.

(b) Preparation of the Mixture with Sulfur (Component B):

Sulfur crystals manufactured by Wako Pure Chemical Industries, Ltd. (purity: 99.9999%) were powdered in an agate mortar and then heat treated for 24 hours by a vacuum dryer (at 55° C. and at 10 mmHg)

In a three-necked flask were charged 14.29 parts by weight of the thus heat-dried powdered sulfur and 75.19 parts by weight of bis(β-epithiopropyl) sulfide, and the mixture was heated at 60° C. and dissolved in a nitrogen atmosphere, followed by stirring at 40° C. for about 12 hours. The reaction mixture was cooled to about 25° C. before mixing.

(c) Preparation of the Mixture with Catalyst (Component C):

Tetrabutylphosphonium bromide (0.04 parts by weight) and bis(β-epithiopropyl) sulfide (2.00 parts by weight) were weighed and dissolved to prepare a solution.

(d) Mixing and Polymerization of Component A, Component B and Component C:

In a three-necked flask charged with 89.48 parts by weight of the component B, 9.52 parts by weight of the component A (the whole amount of bis(isocyanatomethyl)-1,4-dithiane and bis(mercaptomethyl)-1,4-dithiane as the urethane component was 4.76 parts by weight) was added and mixed. To this mixed liquid, 1.02 parts by weight of the component C was added and mixed, and the mixture was subjected to degassing. Thereafter, the mixture was poured into lens molds of 0.00 D and −3.00 D, while filtering through a 1.0-micron filter made of PTFE (polytetrafluoroethylene). Polymerization and curing were carried out by gradually elevating the temperature from 35° C. to 95° C. over 24 hours. After the curing, the cured products were cooled to a temperature in the vicinity of 70° C. and released from the molds, to obtain a 0.00 D (ct: 1.8 mm) lens and a −3.00 D lens. The evaluation results are shown in Table 1. The obtained lenses were transparent and had physical properties of an YI value of 1.81, a refractive index of 1.73, and an Abbe's number of 33.

EXAMPLE 2

Lenses were prepared and evaluated in the same manner as in Example 1, except that the sulfur crystals manufactured by Wako Pure Chemical Industries, Ltd. (purity: 99.9999%) in place of the sulfur as used in Example 1 were sublimated and further recrystallized for purification. The results are shown in Table 1.

EXAMPLES 3 to 9

The same procedures as in Example 1 were followed, except that the types and mixing ratio of the polyisocyanate compound and the polythiol compound and the amount of the epithio group-containing compound to be added were changed as shown in Table 1. The evaluation results are shown in Table 1. Similar to Example 2, lenses were obtained which were transparent, less colored and had characteristics of a high refractive index and a high Abbe's number.

TABLE 1

| | | Example 1 | Example 2 | Example 3 | Example 4 | Example 5 | Example 6 | Example 7 | Example 8 | Example 9 |
|---|---|---|---|---|---|---|---|---|---|---|
| Prepolymer (component A) (parts by weight) | Polyisocyanate compound | BIMD: 1.44 | BIMD: 1.44 | BIMD: 1.44 | BIMD: 1.44 | BIMD: 2.88 | DIMB: 1.33 | DIMB: 1.66 | BIMD: 1.67 | BIMD: 1.65 |
| | Polythiol compound | BMMD: 3.32 | BMMD: 3.32 | BMMD 3.32 | BMMD: 3.32 | BMMD: 6.64 | BMMD: 3.43 | DMES: 3.10 | BMMD: 3.09 | DMTMP: 3.11 |
| | SH/NCO | 2.5 | 2.5 | 2.5 | 2.5 | 2.5 | 2.5 | 2.5 | 2.0 | 2.5 |
| | Epithio group-containing compound | BEPS: 4.76 | BEPS: 4.76 | BEPS: 4.76 | BEPS: 4.76 | BEPS: 9.52 | BEPS: 4.76 | BEPS: 4.76 | BEPS: 4.76 | BEPS: 4.76 |
| | Catalyst: TK-1 | 0.0024 | 0.0024 | 0.0024 | 0.0024 | 0.0024 | 0.0024 | 0.0024 | 0.0024 | 0.0024 |
| Mixture X (component B) (parts by weight) | Epithio group-containing compound | BEPS: 75.19 | BEPS: 75.19 | BEPS: 79.95 | BEPS: 72.81 | BEPS: 65.67 | BEPS: 75.19 | BEPS: 75.19 | BEPS: 75.19 | BEPS: 75.19 |
| | Sulfur | 14.29 | 14.29 | 9.52 | 16.67 | 14.29 | 14.29 | 14.29 | 14.29 | 14.29 |
| Mixture Y (component C) (parts by weight) | Epithio group-containing compound | BEPS:1 | BEPS:1 | BEPS:1 | BEPS:1 | BEPS:1 | BEPS:1 | BEPS:1 | BEPS:1 | BEPS:1 |
| | Catalyst: TBPB | 0.02 | 0.02 | 0.02 | 0.02 | 0.02 | 0.02 | 0.02 | 0.02 | 0.02 |
| Composition ratio | Urethane component | 5 | 5 | 5 | 5 | 10 | 5 | 5 | 5 | 5 |
| | Epithio component | 85 | 85 | 90 | 82.5 | 80 | 85 | 85 | 85 | 85 |
| | Sulfur component | 15 | 15 | 10 | 17.5 | 15 | 15 | 15 | 15 | 15 |
| Appearance | | Transparent | Transparent | Transparent | Transparent | Transparent | Transparent | Transparent | Transparent | Transparent |
| YI value | | 1.8 | 1.8 | 1.6 | 1.9 | 1.8 | 1.8 | 1.8 | 1.7 | 1.8 |
| Optical characteristics | D Refractive index | 1.73 | 1.73 | 1.72 | 1.74 | 1.73 | 1.72 | 1.72 | 1.73 | 1.73 |
| | $v_D$ (Abbe's number) | 33 | 33 | 34 | 33 | 33 | 34 | 34 | 33 | 33 |

Reference Examples 1 to 3

Lenses were prepared and evaluated in the same manners as in Examples 1, 3 and 4, respectively, except that sulfur crystals manufactured by Wako Chemical Industries, Ltd. (purity: 99.9999%) were used as they were, without being treated in place of the sulfur as used in Examples 1, 3 and 4. The resulting resins were colored yellow compared with those of the corresponding Examples.

TABLE 2

|  |  | Reference Example 1 | Reference Example 2 | Reference Example 3 |
|---|---|---|---|---|
| Prepolymer (component A) (parts by weight) | Polyisocyanate compound | BIMD: 1.44 | BIMD: 1.44 | BIMD: 1.44 |
|  | Polythiol compound | BMMD: 3.32 | BMMD: 3.32 | BMMD: 3.32 |
|  | SH/NCO | 2.5 | 2.5 | 2.5 |
|  | Epithio group-containing compound | BEPS: 4.76 | BEPS: 4.76 | BEPS: 4.76 |
|  | Catalyst: TK-1 | 0.0024 | 0.0024 | 0.0024 |
| Mixture X (component B) (parts by weight) | Epithio group-containing compound | BEPS: 75.19 | BEPS: 79.95 | BEPS: 72.81 |
|  | Sulfur | 14.29 | 9.52 | 16.67 |
| Mixture Y (component C) (parts by weight) | Epithio group-containing compound | BEPS: 1 | BEPS: 1 | BEPS: 1 |
|  | Catalyst: TBPB | 0.02 | 0.02 | 0.02 |
| Composition ratio | Urethane component | 5 | 5 | 5 |
|  | Epithio component | 85 | 90 | 82.5 |
|  | Sulfur component | 15 | 10 | 17.5 |
| Appearance |  | Transparent | Transparent | Transparent |
| YI value |  | 22.3 | 16.7 | 25.4 |
| Optical characteristics | D (Refractive index) | 1.73 | 1.72 | 1.74 |
|  | $\nu_D$ (Abbe's number) | 33 | 34 | 33 |

BIMD: Bis(isocyanatomethyl)-1,4-dithiane
DIMB: Bis(isocyanatomethyl)bicyclo[2,2,1]heptane
BMMD: Bis(mercaptomethyl)-1,4-dithiane
DMES: Bis(mercaptoethyl) sulfide
DMTMP: 1,2-Bis(mercaptoethylthio)-3-mercaptopropane
BEPS: Bis(β-epithiopropyl) sulfide
TBPB: Tetrabutylphosphonium bromide
TK-1: Tetrabutyl-diacetoxy-distannoxane According to the production process of the invention, excellent plastic lenses for spectacles, which have a high refractive index and a high Abbe's number, and which are transparent and less colored can be obtained.

While the invention has been described in connection with certain embodiments so that aspects thereof may be more fully understood and appreciated, it is not intended to limit the invention to these particular embodiments. On the contrary, it is intended to cover all alternatives, modifications and equivalents as may be included within the scope of the invention as defined by the appended claims.

What is claimed is:

1. Process for producing a plastic lens, which comprises mixing a) a prepolymer obtainable by reacting a polyisocyanate compound and a polythiol compound in an epithio group-containing compound with b) a mixture comprising sulfur having a purity of 98% or more, from which impurities having a boiling point of 120° C. or lower have substantially been removed, in an epithio group-containing compound and c) a catalyst.

2. Process according to claim 1, wherein the catalyst c) is added as a mixture of the catalyst with an epithio group-containing compound and/or a polythiol compound.

3. Process according to claim 1, wherein the ratio of the polythiol compound to the polyisocyanate compound in the prepolymer is 1.75 or more in terms of —SH/—NCO molar ratio.

4. Process according to claim 1, wherein the weight of the epithio group-containing compound in the prepolymer is 50% by weight or more of the whole amount of the starting materials of the prepolymer.

5. Process according to claim 1, wherein the content of sulfur is in the range of from 5 to 30% by weight of the whole amount of the starting materials a), b) and c).

6. Process according to claim 1, wherein the whole of the polyisocyanate and the polythiol compounds used for the starting materials a) and c) of the lens is 15% by weight or less of the whole amount of the starting materials a), b) and c).

7. Process according to any one of claims 1–6, wherein the polyisocyanate compound is one or more of the group consisting of bis(isocyanatomethyl)bicyclo[2,2,1]heptane, cyclohexane diisocyanate, and bis(isocyanatomethyl)-1,4-dithiane.

8. Process according to any one of claims 1–6, wherein the polythiol compound is at least one member selected from bis(mercaptomethyl)-1,4-dithiane, bis(mercaptoethyl) sulfide, bis(mercaptoethyl) disulfide, and 1,2-bis(mercaptoethyl)thio-3-mercaptopropane.

9. Process according to any one of claims 1–6, wherein the epithio group-containing compound is bis(β-epithiopropyl) sulfide and/or bis(β-epithiopropyl) disulfide.

10. Process according to any one of claims 1–6, wherein a catalyst is added to the reaction mixture for preparing the prepolymer.

11. Process according to claim 10, wherein the catalyst is represented by the following general formula (I):

(I)

wherein $R_1$ to $R_4$, which may be the same or different, each represents an alkyl group having from 1 to 4 carbon atoms.

12. Process according to claim 11, wherein the catalyst represented by the general formula (I) is at least one member selected from tetramethyl-diacetoxy-distannoxane, tetraethyl-diacetoxy-distannoxane, tetrapropyl-diacetoxy-distannoxane, and tetrabutyl-diacetoxy-distannoxane.

13. Plastic lens obtainable by the process according to any one of claims 1 to 6.

14. Plastic lens comprising sulfur having a purity of 98% or more, from which impurities having a boiling point of 120° C. or lower have substantially been removed.

15. Plastic lens according to claim 14, obtainable by reacting a polyisocyanate compound, a polythiol compound, an epithio group-containing compound, and sulfur having a purity of 98% or more, from which impurities having a boiling point of 120° C. or lower have substantially been removed.

16. Plastic lens according to claim 15, wherein the polyisocyanate compound is one or more of the group consisting of bis(isocyanatomethyl)bicyclo[2,2,1]heptane, cyclohexane diisocyanate, and bis(isocyanatomethyl)-1,4-dithiane.

17. Plastic lens according to claim 15, wherein the polythiol compound is at least one member selected from bis(mercaptomethyl)-1,4-dithiane, bis(mercaptoethyl) sulfide, bis(mercaptoethyl) disulfide, and 1,2-bis(mercaptoethyl)thio-3-mercaptopropane.

18. Plastic lens according to claim 15, wherein the epithio group-containing compound is bis(β-epithiopropyl) sulfide and/or bis(β-epithiopropyl) disulfide.

19. Plastic lens according to claim 14 or 15, which is transparent.

* * * * *